United States Patent [19]

Haka

[11] Patent Number: 4,969,546
[45] Date of Patent: Nov. 13, 1990

[54] FLUID OPERATED CLUTCH WITH A DIRECTIONAL TORQUE CONTROL

[75] Inventor: Raymond J. Haka, Rochester Hills, Mich.

[73] Assignee: General Motors Corporation, Detroit, Mich.

[21] Appl. No.: 391,917

[22] Filed: Jul. 27, 1989

[51] Int. Cl.⁵ ............................................. F16D 25/06
[52] U.S. Cl. ............................. 192/85 AA; 192/56 F
[58] Field of Search .......... 192/85 AA, 106 F, 109 F, 192/56 F

[56] References Cited

U.S. PATENT DOCUMENTS 3,734,251  5/1973  Annis et al. ........................... 192/3.3
4,186,829  2/1980  Schneider et al. ............ 192/85 AA
4,805,752  2/1989  Malloy et al. ................. 192/85 AA

*Primary Examiner*—Richard Lorence
*Assistant Examiner*—Andrea Pitts
*Attorney, Agent, or Firm*—Donald F. Scherer

[57] ABSTRACT

A fluid operated clutch has a fluid apply chamber which is selectively pressurized to control clutch engagement. A pressure control valve and a directional sensitive feed mechanism cooperate to establish separate apply pressure functions for the clutch dependent upon the direction of torque transmission. The control valve is effective to prevent the chamber from being pressurized during a predetermined range of system pressure.

2 Claims, 2 Drawing Sheets

FLUID OPERATED CLUTCH WITH A DIRECTIONAL TORQUE CONTROL

BACKGROUND OF THE INVENTION

This invention relates to apply pressure controls for a friction torque transmitting device, and more particularly, to apply pressure controls for a friction torque transmitting device having directional sensitivity.

In the prior art, directional sensitivity in a friction torque transmitting device, such as a clutch or brake, is achieved by incorporating a one-way torque transmitting device in parallel with a friction torque transmitting device. With these devices, it is possible to selectively eliminate or provide engine coast braking during a vehicle coast condition. If the friction torque transmitting device is not engaged, engine braking will not be available and vice versa. These controls require the operator to manually select a position at the manual shift lever to obtain coast braking.

If directional sensitivity is desired in a higher drive ratio; i.e., other than first gear, it is necessary to have a friction torque transmitting device in series with a one-way torque transmitting device as well as a second friction torque transmitting device disposed in parallel drive relation therewith. The series friction device is utilized during a ratio interchange while the parallel friction device is energized when engine coast braking is desired.

With these prior art devices, at least one friction device and a one-way torque transmitting device are necessary to provide selective coast braking. Obviously, these devices require the allocation of axial space and increase the cost of manufacture. The use of selective coast braking or reverse torque transmittal does improve shift quality and perceived performance during normal upshift ratio change operations. To this end, such devices are considered to add value to the transmissions.

It is also known to provide a fluid operated friction torque transmitting device wherein a pair of opposing chambers are provided such that on torque reversal, fluid pressure is directed to both chambers to reduce the torque capacity of the friction device. The additional fluid chamber is of smaller area than the normal apply chamber, such that the friction device is always available to transmit some reverse torque. Such a device is shown in U.S. Pat. No. 4,805,752 issued to Malloy et al. on Feb. 21, 1989, and assigned to the assignee of the present invention. In Malloy et al., there is discussion of two other types of direction sensitive devices which utilize a fluid operated friction device. In these devices the apply chamber is exhausted during torque reversal thereby eliminated coast braking. Assemblies of such devices are shown in U.S. Pat. No. 3,734,251 issued to Annis et al. Feb. 22, 1973, and U.S. Pat. No. 3,410,370 to Maurice Nov. 12, 1968.

SUMMARY OF THE INVENTION

The present invention achieves selective engine coast braking or reverse torque transmittal while using a single friction torque transmitting assembly, a control valve and a direction sensitive fluid interface or valve. This permits the elimination of the one-way torque transmitting assemblies which are utilized in the prior art such that improved economy of manufacture is achieved. This current device also reduces the axial spaced requirement.

The control valve is preferably located centrally in a shaft member in direct fluid communication with a pressure feed passage for the friction torque transmitting assembly. The control valve mechanism is affective to reduce the apply pressure in the engagement chamber of the friction torque transmitting assembly upon torque reversal; thereby reducing the torque capacity thereof such that reverse direction transmission is controlled.

In the preferred embodiment of this invention, the apply pressure, upon direction reversal, is controlled as a function of engine torque or throttle pressure. Other operating parameters can be used to control the pressure level within the transmission control system which can affect the torque capacity of the friction torque transmitting assembly. For example, a line boost directly proportional to the governor pressure and inversely proportional to throttle pressure can ensure engine braking at elevated vehicle speeds when the throttle setting is low, while preventing the transmission of torque reversals by the friction device during normal shifting functions.

It is therefore an object of this invention to provide and improved fluid operated friction torque transmitter having a directional sensitive control valve to permit selective torque transmittal during a torque reversal at the friction torque transmitter.

It is another object of this invention to provide an improved fluid operated friction torque transmitting device and control wherein a valve member and a direction sensitive fluid interface are interconnected to control the fluid pressure in the fluid operated friction torque transmitting device to control the torque capacity thereof when a direction reversal occurs at the friction torque transmitting device.

These and other objects and advantages of the present invention will be more apparent from the following specification and drawings.

DESCRIPTION OF THE PREFERRED EMBODIMENT

Figure 1:
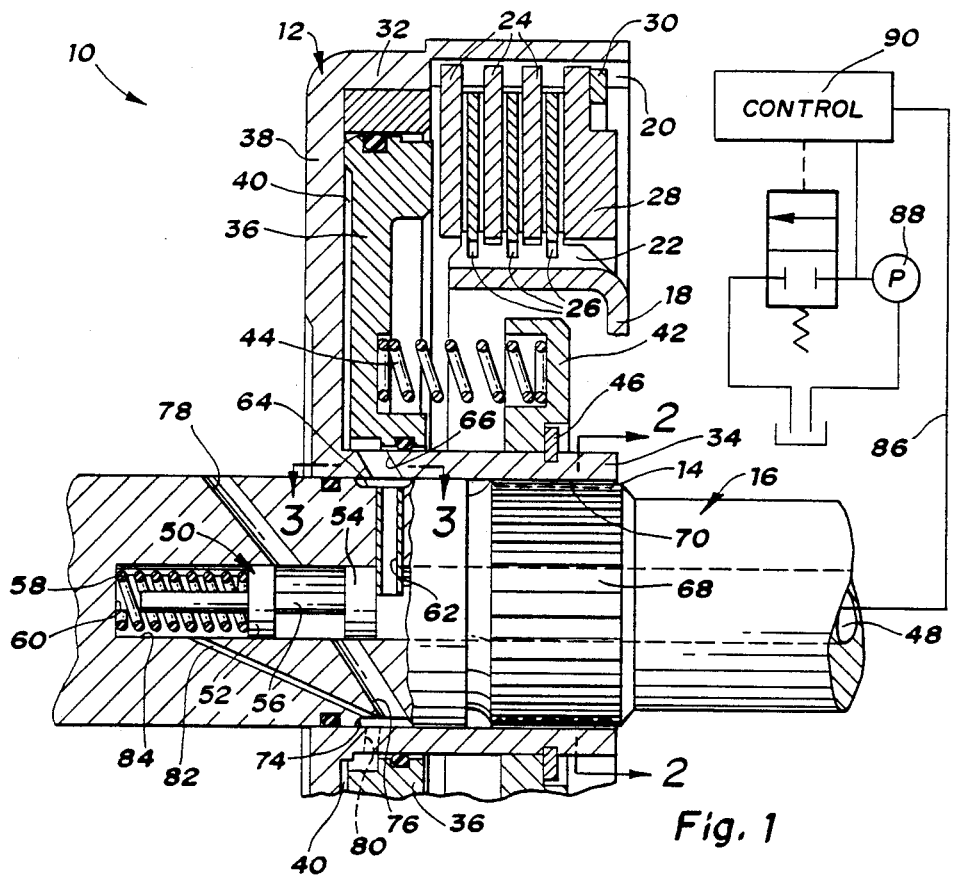
FIG. 1 is a cross sectional elevational view of a friction torque transmitting device and control valve and a schematic representation of a hydraulic support system.

Referring to the drawings, there is seen in FIG. 1, a fluid operated friction torque transmitting device such as a clutch 10, having a housing 12 which is splined at 14 to a shaft member 16. The clutch 10 has an output member or hub 18 adapted to be connected to a torque transmitting member such as a gear, not shown. The structural connections between a friction clutch and a gear member are well known to those skilled in the art, such that a discussion of structure to accomplish this connection is not considered necessary for an understanding of the present invention The housing 12 and the hub 18 have respective spline portions 20 and 22 which are drivingly connected to respective alternately spaced friction plates 24 and 26. A backing plate 28 is also splined to the housing 12 at spline 20 and is limited in rightward movement by a conventional locking ring 30. The housing 12 has an outer cylindrical portion 32 and an inner cylindrical portion 34 between which is slidably disposed a fluid operated piston 36. The space between the cylindrical portions 32 and 34 is annular as is the piston 36.

The piston 36 cooperates with the inner and outer cylindrical portions 32 and 36 and an end wall 38 to form a clutch apply chamber 40. The inner cylindrical portion 34 has mounted thereon an annular spring retainer 42 which cooperates with the piston 36 to trap a plurality of compression springs, such as 44. Rightward movement of the retainer 42 is limited by a conventional locking ring 46 such that the springs 44 will impose a leftward force on the piston 36 urging the piston 36 to a disengaged position shown. When the piston 36 is maintained in the position shown, the friction plates 24 and 26 are free to rotate relative to each other without transmitting torque between the housing 12 and the hub 18.

The shaft 16 has a central fluid passage 48 in which is slidably disposed a valve spool 50. The valve spool 50 has a pair of valve lands 52 and 54 interconnected by a shaft member 56. A compression spring 58 is compressed between the bottom or blind end 60 of passage 48 and the leftward side of land 52. The spring 58 urges the valve spool 50 in the passage 48.

Figure 3:
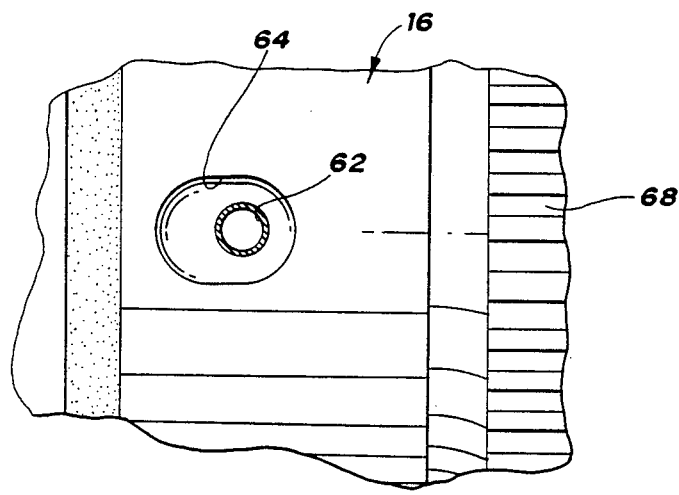
FIG. 3 is a view taken along line 3—3 of FIG. 1.

Rightward movement of the valve spool 50 in the passage 48 is limited by a tube or pressure passage 62 which is pressfit in the shaft 16. The tube 62 provides fluid communication between the passage 48 and the recess 64 formed in the outer peripheral surface of shaft 16, as best seen in FIGS. 1 and 3.

The inner cylindrical surface 34 has formed therein a passage 66 which communicates with the apply chamber 40 and is alignable with the recess 64. The alignment between passage 66 and recess 64 is controlled by the spline connection 14 which is comprised of a plurality of splines 68 formed on the shaft 16 and 70 formed on the inner cylindrical portion 34. The recess 64 and passage 66 provide a control valve or fluid interface which, as will be later explained, is controlled by the direction of torque transmission.

Figure 2:
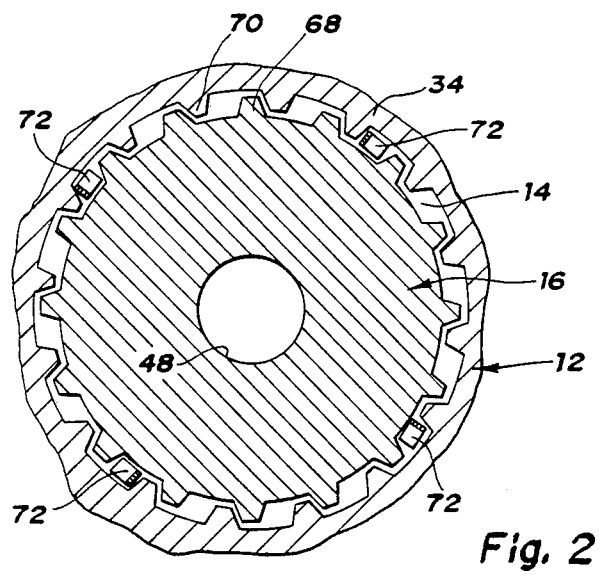
FIG. 2 is a sectional view taken along line 2—2 of FIG. 1.

As best seen in FIG. 2, the splines 68 and 70 have a free space therebetween such that limited relative rotation is permitted between the shaft 16 and cylindrical portion 34. A plurality of spring members 72 are disposed between selective pairs of splines 68 and 70 to urge the shaft 16 clockwise, as seen in FIG. 2, relative to the cylindrical portion 34. This is the direction of rotation of the shaft 16 when torque is being transmitted from the shaft 16 to the housing 12.

When the housing is subjected to a torque reversal, the cylindrical portion 34 will rotate clockwise relative to the shaft 16 and against the force in the springs 72 to disconnect communication between the recess 64 and the passage 66. Thus, during reverse torque transmittal direction fluid communication between passage 48 and the apply chamber 40 is not permitted.

The outer peripheral surface of the shaft 16 has another recess 74 formed therein which is connected with a control passage 76, which in turn communicates with the fluid passage 48. Also in fluid communication with the passage 48 is an exhaust passage 78. The recess 74 is selectively placed in communication with a passage 80 which communicates with the apply chamber 40. The recess 74 is disposed in communication with the passage 80 after relative rotation between the cylindrical portion 34 and the shaft 16 occurs during torque reversals.

Thus, another direction sensitive fluid interface is provided by passage 80 and recess 74.

The recess 74 also has a second control passage 82 which is in fluid communication with a chamber 84 in which the spring 58 is disposed. Fluid within the chamber 84 will be effective to apply a rightward force to the valve spool 50. The passage 48 is supplied with pressurized fluid through a passage 86 from a conventional hydraulic pump 88 and a conventional transmission control 90. The control 90 will provide a pressure level in the fluid which is proportional or otherwise controlled relative to the torque level of the engine and/or vehicle speed. Such controls are well known and need not be further elaborated upon for an understanding of this invention.

When it is desirable to engage the clutch 10, the passage 86 is pressurized such that fluid pressure is directed through passage 48, tube 62, recess 64 and passage 66 to the apply chamber 40. Fluid pressure in the apply chamber 40 causes the piston 36 to be urged into abutment with the leftmost friction plate 24 thereby encouraging friction torque transmittal between the clutch housing 12 and the hub 18. This is a conventional clutch engagement. However, during vehicle coasting, the torque will be transmitted from the hub 18 to the housing 12. This will cause the housing 12 to rotate slightly relative to the shaft 16 thereby disconnecting the recess 64 from passage 66, while interconnecting recess 74 and passage 80.

The passage 76 is controlled by the position of valve land 54 of the spool 51. If the fluid pressure in passage 48 is sufficient to cause the valve spool 50 to move leftward against the spring 58, fluid pressure will be delivered via the passage 76 to the apply chamber 40. However, this pressure is likewise distributed via passage 82 to the chamber 84 which operates in opposition to the pressure in passage 48 to move the valve spool rightward, thereby limiting the pressure within the apply chamber 40.

Figure 4:
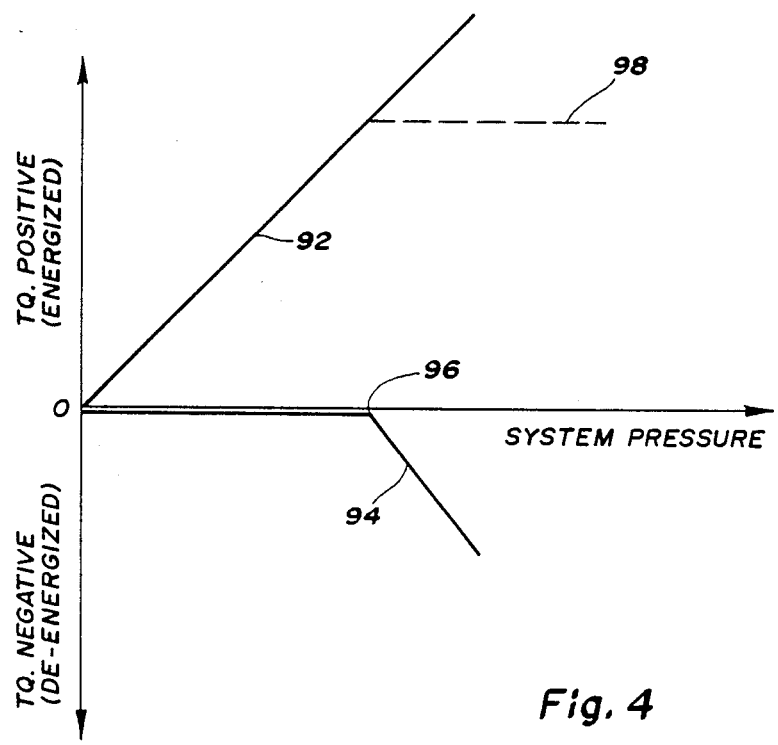
FIG. 4 is a chart depicting curves showing torque v. apply pressure.

The curve shown in FIG. 4, depicts a positive torque transmittal curve 92 and a negative torque transmittal curve 94. During forward torque transmission, the torque capacity of the clutch 10 increases from zero in proportion with increases in system pressure. However, on torque reversals, fluid pressure in not admitted to the apply chamber 40 until the system pressure is sufficiently high to overcome the force in the spring 58. Therefore, as seen in FIG. 4 and curve 94, the clutch 10 does not transmit negative torque or reverse torque prior to the system pressure being greater than that represented by a point 96. After the system pressure reaches the point 96, the negative torque capacity of the clutch 10 will increase proportionally to any further increases in system pressure.

The pressure in the clutch apply chamber 40 can be limited to the torque level presented by the dashed line 98 shown in FIG. 4, if the valve spool 50 is permitted to interconnect the passage 76 and passage 48 during the forward transmission of torque. This may be useful in some transmission systems where it is desirable to control the maximum torque transmitting value of a clutch or other friction torque transmitting device within the system.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A directional sensitive torque transmitting apparatus comprising an input member; an output member; a plurality of friction discs axially disposed and alternately connected to said input member and said output member, respectively; piston and chamber means operatively connected with one of said friction discs for forcing said friction discs into frictional engagement to establish a torque transmitting path between said input and output members; a fluid pressure source means for supplying fluid pressure to said piston and chamber means; first and second fluid passage means selectively communicating with said piston and chamber means, said first passage means being in communication with said pressure source means and said second passage means being in selective fluid communication with an exhaust means; first valve means operatively connected to one of the input and output member and being sensitive to the direction of torque transmission thereof to selectively communicate the first passage means with said piston and chamber means during a first direction of torque transmission and for selectively communicating said second passage means with said piston and chamber means during a second direction of torque transmission opposite said first direction; and control valve means disposed in communication with said first and second passage means and being responsive to the fluid pressure therein to reduce the pressure in said piston and chamber means during said second direction of torque transmission.

2. A directional sensitive torque transmitting apparatus comprising an input member; an output member; a plurality of friction discs axially disposed and alternately connected to said input member and said output member, respectively; piston and chamber means operatively connectible with one of said friction discs for forcing said friction discs into frictional engagement to establish a torque transmitting path between said input and output members; a fluid pressure source means for supplying fluid pressure to said piston and chamber means; first and second fluid passage means selectively communicating with said piston and chamber means, said first passage means being in communication with said pressure source means and said second passage means being in selective fluid communication with an exhaust means; first fluid interface means operatively connected with the input member and the chamber means and being sensitive to the direction of torque transmission thereof to selectively communicate the first passage means with said piston and chamber means during a first direction of torque transmission; second fluid interface means operatively connected with the input member and the chamber means for selectively communicating said second passage means with said piston and chamber means during a second direction of torque transmission opposite said first direction; and control valve means disposed in communication with said first and second passage means for controlling the fluid pressure in said piston and chamber means during said first direction of torque transmission and including spring means and a control pressure passage for reducing the pressure in said piston and chamber means during said second direction of torque transmission.

* * * * *